April 24, 1928. 1,667,664
F. KADE
COMPENSATED INDUCTION MOTOR FOR SINGLE OR
POLYPHASE ALTERNATING CURRENT
Filed June 20, 1925
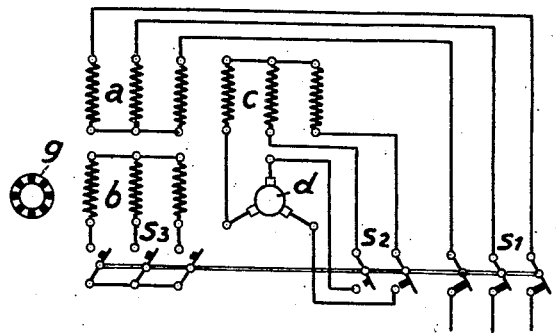
Inventor:
Friedrich Kade Patented Apr. 24, 1928.

1,667,664

UNITED STATES PATENT OFFICE.

FRIEDRICH KADE, OF KIEL, GERMANY, ASSIGNOR TO DEUTSCHE WERKE KIEL AKTIENGESELLSCHAFT, OF KIEL, GERMANY, A CORPORATION OF GERMANY.

COMPENSATED INDUCTION MOTOR FOR SINGLE OR POLYPHASE ALTERNATING CURRENT.

Application filed June 20, 1925, Serial No. 38,578, and in Germany June 25, 1924.

The subject of patent application Serial No. 702,158 filed March 28th, 1924, is a compensated induction motor having on the stator a winding adapted to be connected with the mains and an auxiliary winding, and on the rotor a polyphase exciting winding adapted to be connected with the auxiliary stator winding across a commutator, a winding which carries the working current provided with short-circuiting contacts and an auxiliary squirrel cage winding for starting the motor.

This squirrel cage winding is dimensioned from the point of view that a sufficiently strong starting torque is produced in order to secure the starting of the motor. It is, however, important that the current impulse which the motor takes up from the mains does not exceed a certain value, and in view of this latter condition it is necessary to give the starting winding a large electrical resistance. If a motor designed from this aspect is started under load by means of the squirrel cage winding only a limited starting speed is attained, which is the lower, the greater the counter-torque of the shaft. After the motor has been started, the exciting current must be closed. The current impulse hereby set up is the greater the lower the starting speed of the motor. This current impulse can readily assume a disagreeable value.

The present invention enables this disadvantage to be overcome. According to the invention after starting the motor not all the phases of the exciting circuit are at once closed, but only one or two phases of the auxiliary stator winding are connected with the commutator winding, the whole of the phases being connected upon the next following switch operation. In this manner a substantial reduction of the current impulse is effected, so that the starting of the motor is not so disadvantageous to the mains.

The accompanying drawing illustrates diagrammatically by way of example a method of carrying the invention into effect. The main winding $a$ adapted to be connected to the mains by switch $s_1$ and the auxiliary winding $c$ are arranged on the stator. The winding $c$ is to be connected by switch $s_2$ with the exciting winding (not shown) of the rotor in the usual way across a commutator $d$. In addition to the exciting winding a working winding $b$ is mounted on the rotor which can be short-circuited by the switch $s_3$. The auxiliary squirrel cage winding is indicated by $g$. The switches $s_1$, $s_2$ and $s_3$ are rigidly connected together e. g. by means of a controller as diagrammatically shown in Fig. 2. The switch $s_2$ is so arranged and adjusted that upon switching over from the first switch position into the second only one or two phases of the winding $c$ are connected to the commuted exciting winding, which is effected for example by making the contacts of switch $s_2$ of unequal length.

With the switch means shown in the drawing the switch operations upon actuating the positively coupled switches $s_1$, $s_2$ and $s_3$ are as follows:—During the switching-in operation the stator winding $a$ is first connected to the mains by the switch $s_1$ (1st step), whereupon the longer arms of switch $s_2$ connects a single or double phase of the auxiliary winding $c$ with the commuted exciting winding (2nd. step). Upon further operation of the switch, the shorter arm of the switch $s_2$ connects the auxiliary winding $c$ with the commutator exciting winding in its full number of phases (3rd step). The final switch operation then closes the switch $s_3$ whereby the working winding $b$ of the rotor is totally closed.

I claim:—

1. A compensated induction motor, having a main stator winding adapted to be connected with the mains, a polyphase auxiliary stator winding, a commutator, brushes on the commutator adapted to be connected with said auxiliary stator winding, a polyphase commutator winding, said commutator winding and said auxiliary stator winding forming the exciting circuit of the motor, a working winding on the rotor provided with short-circuiting contacts, an auxiliary squirrel cage starting winding, and controlling means adapted to successively connect the several phases of the said exciting circuit.

2. A compensated induction motor, having a main stator winding adapted to be connected with the mains, a polyphase auxiliary stator winding, a commutator, brushes on the commutator adapted to be connected with said auxiliary stator winding, a polyphase commutator winding, said commutator winding and said auxiliary stator winding forming the exciting circuit of the motor, a working winding on the rotor provided with short-circuiting contacts, an auxiliary squirrel cage starting winding, and controlling means adapted to successively connect the several phases of said exciting circuit after having connected the main stator winding with the mains.

FRIEDRICH KADE.